Figure 1:
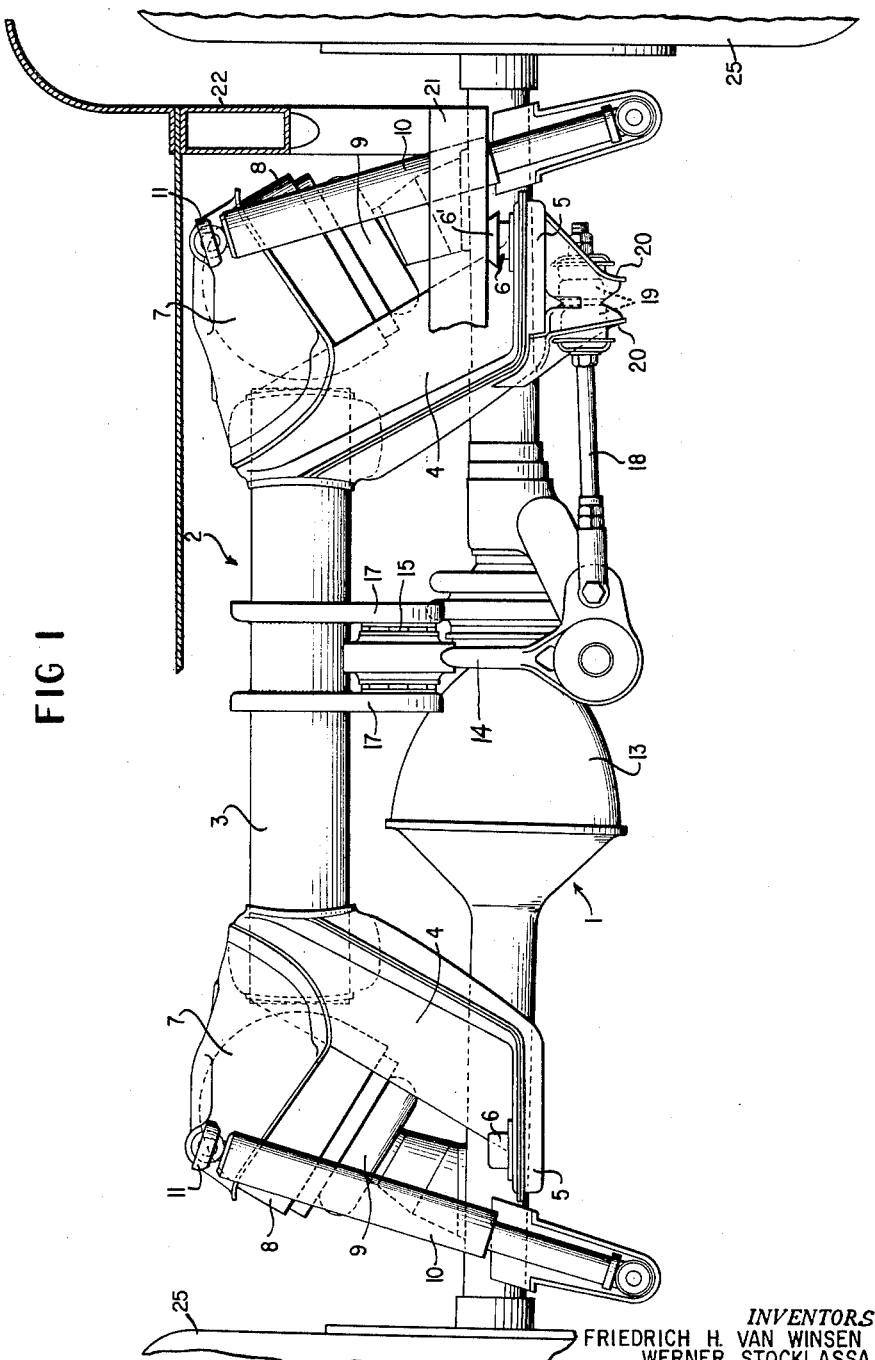

Feb. 9, 1965  F. H. VAN WINSEN ETAL  3,168,930
AUXILIARY FRAME, ESPECIALLY FOR MOTOR VEHICLES
Filed July 18, 1961  2 Sheets-Sheet 1

INVENTORS.
FRIEDRICH H. VAN WINSEN
WERNER STOCKLASSA
BY
Dicke, Craig & Freudenberg
ATTORNEYS.

Feb. 9, 1965    F. H. VAN WINSEN ETAL    3,168,930
AUXILIARY FRAME, ESPECIALLY FOR MOTOR VEHICLES
Filed July 18, 1961    2 Sheets-Sheet 2

INVENTORS.
FRIEDRICH H. VAN WINSEN
WERNER STOCKLASSA
BY
ATTORNEYS.

United States Patent Office 3,168,930
Patented Feb. 9, 1965

3,168,930
AUXILIARY FRAME, ESPECIALLY FOR MOTOR VEHICLES
Friedrich H. van Winsen, Kirchheim (Teck), and Werner Stoklassa, Esslingen (Neckar), Germany, assignors to Daimler-Benz Aktiengesellschaft, Stuttgart-Unterturkheim, Germany
Filed July 18, 1961, Ser. No. 124,997
Claims priority, application Germany, July 20, 1960, D 33,816
10 Claims. (Cl. 180—73)

The present invention relates to an auxiliary frame for vehicles, especially motor vehicles which is suspended elastically at the vehicle superstructure such as the main frame or vehicle body of a self-supporting type body construction, and which carries the axle unit, especially the vehicle rear axle constructed as swinging half axle, inclusive the wheel spring system and possibly also the axle gear.

The present invention essentially consists in constituting the auxiliary frame by a tubular support member disposed above the axle in the axle direction, at the ends of which are arranged support arms surrounding or enclosing the vehicle axle in a fork-like manner and provided with securing means extending substantially in the vehicle longitudinal direction or in the vehicle transverse direction for the elastic support thereof at the vehicle superstructure, such as the main frame or vehicle body, and with abutments for the wheel spring system.

According to a further development of the inventive concept, the support arms, as seen in side view in the direction toward the auxiliary frame, may form at each end of the tubular support member the leg portions of a triangle at the apex of which is arranged the tubular support member and along the base line of which are disposed the securing means arranged at the ends of the support arm. As seen in the vehicle longitudinal direction, the support arms may extend from the tubular support member obliquely outwardly in the downward direction. The spring abutments may further be constructed in a box-shaped manner and may be secured or joined to the tubular support member in such a manner that the side parts of the spring abutments adjoin the support arms. Additionally, securing means for the shock absorbers may be arranged at the spring abutments. Furthermore, with an auxiliary frame as support for swinging rear axles, especially for single-joint swinging rear axles, securing means for the axle gear may be arranged at the tubular support member and possibly also at one or several of the support arms.

An auxiliary frame is achieved in accordance with the present invention which is capable to absorb over a relatively large base moments that seek to cause tilting thereof. The support of the auxiliary frame may be distributed advantageously over two cross bearer members of the main frame, and since, in a construction according to the present invention, the longitudinal bearer members of the main frame can be readily extended or guided above the rear axle and below the tubular support member of the auxiliary frame past the support frame thereof, the longitudinal bearer members of the main frame need not be offset or bent excessively. With an arrangement of a swinging half axle construction as rear axle, the longitudinal bearer members of the main frame have to be disposed relatively close to each other because of the space which is required by the swinging half axles. However, also with such a main frame construction, the auxiliary frame according to the present invention may be arranged favorably for all loads. Moreover, lateral supports for the axle or for the axle gear may be arranged very advantageously at the auxiliary frame without necessitating therefor use of the main frame.

Accordingly, it is an object of the present invention to provide an auxiliary frame, especially for a swinging half axle construction of motor vehicles which effectively eliminates the aforementioned shortcomings of the prior art.

It is another object of the present invention to provide an auxiliary frame, especially for the rear axle of a motor vehicle, which is capable of effectively absorbing all moments, over a relatively large base, normally seeking to tilt the auxiliary frame.

Another object of the present invention resides in the provision of an auxiliary frame, particularly for the rear axle of motor vehicles, which permits an advantageous distribution of all forces and loads to be transmitted by the auxiliary frame to the vehicle superstructure such as the main frame or vehicle body of a self-supporting type body construction, and which also enables an advantageous construction of the vehicle superstructure, particularly of the longitudinal bearer members thereof when used with swinging half axles.

Still a further object of the present invention resides in the provision of an auxiliary frame which is elastically supported at the vehicle superstructure and which itself serves to springily suspend therefrom the rear axle of a motor vehicle while at the same time enabling a good distribution of the loads and stresses that may occur therein or be applied thereto.

Still another object of the present invention resides in the provision of an auxiliary frame for the rear axle of a motor vehicle, especially oe provided with swinging half axles, in which not only all loads are advantageously absorbed but also the axle gear may be readily supported at the auxiliary frame without use of the main frame.

These and other objects, features and advantages of the present invention will become more obvious from the following description when taken in connection with the accompanying drawing which shows, for purposes of illustration only, one embodiment in accordance with the present invention, and wherein—

Figure 2:
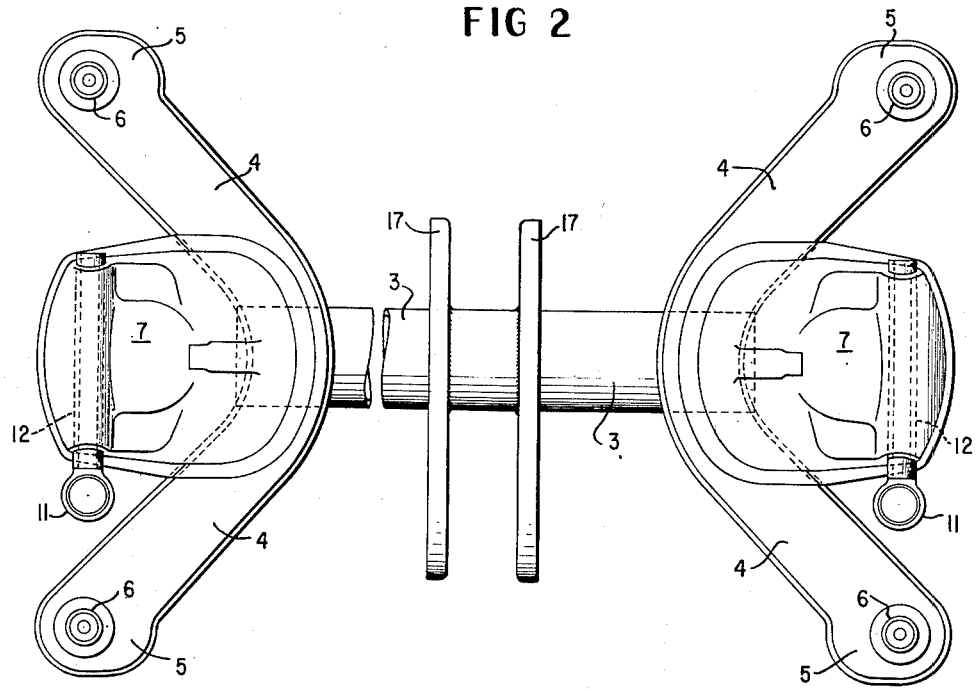
Figure 3:
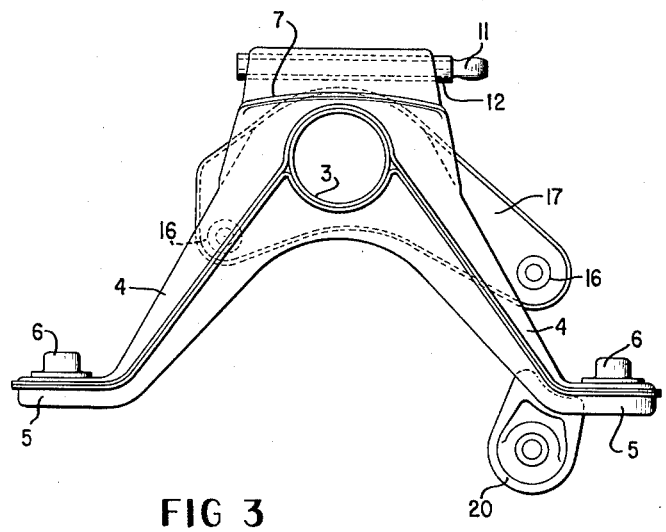

FIGURE 1 is a rear end elevational view of the auxiliary frame in accordance with the present invention together with the single-joint swinging half-axle rear axle construction associated therewith, FIGURE 2 is a top plan view of the auxiliary frame of FIGURE 1, and FIGURE 3 is a side elevational view of the auxiliary frame illustrated in FIGURES 1 and 2.

Referring now to the drawing wherein like reference numerals are used throughout the various views to designate like parts, and more particulary to FIGURE 1, reference numeral 2 generally designates therein the auxiliary frame which is arranged above the vehicle axle generally designated by reference numeral 1. The vehicle axle 1, connected to a pair of the vehicle wheels 25 is constructed as a single-joint swinging half axle rear axle assembly. The auxiliary frame 2 essentially consists of a tubular support member 3 disposed above and extending in the direction of the axle 1 and of support arms 4 located on both sides of the tubular support member 3. As may be readily seen from FIGURES 2 and 3, the support arms 4 are made of stamped or pressed sheet metal parts.

Two support arms 4 are arranged at the ends of the tubular support member 3 in such a manner that the support arms 4, as seen in the vehicle longitudinal direction (FIGURE 1), extend from the tubular support member 3 at an inclination outwardly in the downward direction, and that the support arms 4, as seen in side view of the auxiliary frame (FIGURE 3), form at each end of the tubular support member 3 the leg portions of a triangle at the apex of which is arranged the tubular support member 3. The lower ends 5 of the support arms 4 of the auxiliary frame 2, which, so to speak, surround the vehicle axle 1, are each bent out in the vehicle longitudinal direction and are provided at these ends with securing means 6 for appropriate elastic bearing supports 6', for example, metal-rubber bearings of any suitable construction by means of which the auxiliary frame 2 is supported and secured at the cross bearer members 21 of the main frame 22 forming the vehicle superstructure.

Substantially box-shaped spring abutments 7 which are made of stamped or pressed sheet metal parts are arranged at both ends of the tubular support member 3. The spring abutments 7 are thereby so connected or secured to the ends of the tubular support member 3 that the side parts of the spring abutments 7 adjoin the support arms 4. As shown in FIGURE 1, the pot-shaped members 8 for the springs of the roller-bellows spring means 9 connected with the swinging half axle 1 are supported within the spring abutments 7. Tubular members 12 (FIGURES 2 and 3) provided with securing lugs or eye-portions 11 serve for purposes of supporting at the auxiliary frame 2 the shock absorbers 10 connected with the swinging half axle assembly 1. The tubular members 12 are, at each spring abutment 7, extended through the side parts thereof and are secured thereat.

The pivotal connection of the axle gear 13 of the swinging half axle assembly 1 at the auxiliary frame 2 takes place by guide members 14 which are pivotally connected by means of rubber bearings 15, in front of and to the rear of the tubular support member 3, at the eye portions 16 of the two securing plates 17 which are disposed parallel and adjacent each other, are constructed approximately of arcuate shape and are rigidly secured at the tubular support member 3.

That any requisite support of the vehicle axle 1 transversely to the driving direction at the auxiliary frame 2 is readily feasible, in a simple manner, becomes clear from FIGURE 1 from which may be readily seen that the guide member 18 operatively connected with the axle gear 13 is pivotally connected by means of elastic bearings 19 at the support plates 20 which themselves are secured at one of the support arms 4 of the auxiliary frame 2.

While we have shown and described one embodiment in accordance with the present invention, it is obvious that the same is not limited thereto but is susceptible to many changes and modifications within the spirit and scope thereof, and we therefore do not wish to be limited to the details shown and described herein, but intend to cover all such changes and modifications as are encompassed by the scope of the appended claims.

We claim:

1. In a vehicle having at least one pair of oppositely disposed wheels, means for spring supporting said wheels including axle means and spring means, and a vehicle superstructure including a main frame and an auxiliary frame, the improvement consisting essentially of an auxiliary frame structure for supporting said axle means comprising a support member disposed above said axle means and extending in substantially the same direction as said axle means, separate fork-like support arm means secured to each end of said support member, each said fork-like support arm means extending downwardly and obliquely outwardly as seen in the vehicle longitudinal direction and forming at the respective end of said support member, as seen in side view, the leg portions of a triangle at the apex of which is arranged said support member, each said support arm means surrounding said axle means with said apex of the respective triangle being disposed above said axle means, and means for elastically supporting said auxiliary frame from said main frame comprising securing means extending in one of the vehicle tranverse and longitudinal directions, said securing means being provided on the free ends of each said support arm means and being disposed substantially in a plane extending through the base line of the respective triangle parallel to the road surface, said base line extending substantially longitudinally of the vehicle, and abutment means for said spring means arranged adjacent each said support arm means and rigidly secured to said support member, said spring abutment means being of substantially box-shaped construction and being so secured to said support member that the side portions thereof adjoin said support arm means.

2. In a vehicle having at least one pair of oppositely disposed wheels, means for spring supporting said wheels including axle means and spring means, and a vehicle superstructure including a main frame and an auxiliary frame, the improvement consisting essentially of an auxiliary frame structure for supporting said axle means comprising a support member disposed above said axle means and extending in substantially the same direction as said axle means, separate fork-like support arm means secured to each end of said support member, each said fork-like support arm means extending downwardly and obliquely outwardly as seen in the vehicle longitudinal direction and forming at the respective end of said support member, as seen in side view, the leg portions of a triangle at the apex of which is arranged said support member, each said support arm means surrounding said axle means with said apex of the respective triangle being disposed above said axle means, and means for elastically supporting said auxiliary frame from said vehicle superstructure comprising securing means extending in one of the vehicle transverse and longitudinal directions, said securing means being provided on the free ends of each said support arm means and being disposed substantially in a plane extending through the base line of the respective triangle parallel to the road surface, said base line extending substantially longitudinally of the vehicle, and abutment means for said spring means arranged adjacent each said support arm means and rigidly secured to said auxiliary frame structure.

3. In a vehicle having axle means and a vehicle superstructure including a main frame and an auxiliary frame, the improvement consisting essentially of an auxiliary frame structure for supporting said axle means comprising a tubular support member disposed above said axle means and extending in substantially the same direction as said axle means, separate fork-like support arm means secured to each end of said tubular support member, each said fork-like support arm means extending downwardly and obliquely outwardly as seen in the vehicle longitudinal direction and forming at the respective end of said tubular support member, as seen in side view, the leg portions of a triangle at the apex of which is arranged said tubular support member, each said support arm means surrounding said axle means with said apex of the respective triangle being disposed above said axle means, and means for elastically supporting said auxiliary frame from said main frame comprising securing means extending in one of the vehicle transverse and longitudinal directions, said securing means being provided on the free ends of each said support arm means and being disposed substantially in a plane parallel to the road surface through the base line of the respective triangle, said base line extending substantially longitudinally of the vehicle.

4. In a vehicle having a single joint swinging half-axle rear axle means including axle gear means forming a part of one of the swinging half axles, and a vehicle superstructure including a main frame and an auxiliary frame, the improvement consisting essentially of an auxiliary frame structure for supporting said axle means comprising a support member disposed above said axle means and extending in substantially the same direction as said axle means, separate fork-like support arm means secured to each end of said support member, each said fork-like support arm means forming at the respective end of said support member, as seen in side view, the leg portions of a triangle at the apex of which is arranged said support member, each said support arm means surrounding said axle means with said apex of the respective triangle being disposed above said axle means, and means for elastically supporting said auxiliary frame from said vehicle superstructure comprising securing means extending in one of the vehicle transverse and longitudinal directions, said securing means being provided on the free ends of each said support arm means and being disposed substantially in a plane passing through the base lines of the triangles, and means for elastically supporting said axle gear means at said auxiliary frame structure including first means elastically supporting said axle gear means at said support member for swinging movements about a substantially longitudinal vehicle axis and second means for elastically supporting said axle gear means at one of said support arm means to effectively brace said axle gear means in the vehicle transverse direction.

5. In a vehicle having axle means and a vehicle superstructure including a main frame and an auxiliary frame, the improvement consisting essentially of an auxiliary frame structure for supporting said axle means comprising a tubular support member disposed above said axle means and extending in substantially the same direction as said axle means, separate fork-like support arm means secured to each end of said tubular support member, each said fork-like support arm means forming at the respective end of said tubular support member, as seen in side view, the leg portions of a triangle at the apex of which is arranged said tubular support member, each said support arm means surrounding said axle means with said apex of the respective triangle being disposed above said axle means, and means for elastically supporting said auxiliary frame from said main frame comprising securing means extending in one of the vehicle transverse and longitudinal directions, said securing means being provided on the free ends of each said support arm means and being disposed substantially along the base line of the respective triangle.

6. In a vehicle having a single joint swinging half-axle rear axle means including axle gear means forming a part of one of the swinging half axles, and a vehicle superstructure including a main frame and an auxiliary frame, the improvement consisting essentially of an auxiliary frame structure for supporting said axle means comprising a tubular support member disposed above said axle means and extending in substantially the same direction as said axle means, separate fork-like support arm means secured to each end of said tubular support member, each said fork-like support arm means extending downwardly and obliquely outwardly as seen in the vehicle longitudinal direction and forming at the respective end of said tubular support member, as seen in side view, the leg portions of a triangle at the apex of which is arranged said tubular support member, each said support arm means surrounding said axle means with said apex of the respective triangle being disposed above said axle means, and means for elastically supporting said auxiliary frame from said main frame comprising securing means extending in one of the vehicle transverse and longitudinal directions, said securing means being provided on the free ends of each said support arm means and being disposed substantially in a plane passing through the base line of the respective triangle, and means for elastically supporting said axle gear means at said auxiliary frame structure including first means elastically supporting said axle gear means at said support member for swinging movements about a substantially longitudinal vehicle axis and second means for elastically supporting said axle gear means at one of said support arm means to effectively brace said axle gear means in the vehicle transverse direction.

7. In a vehicle having a vehicle superstructure including a main frame and an auxiliary frame, at least one pair of oppositely disposed wheels, and means for spring supporting said wheels from said auxiliary frame including axle means and spring means, the improvement consisting essentially of an auxiliary frame structure for supporting said axle means comprising a tubular support member disposed above said axle means and extending in substantially the same direction as said axle means, separate fork-like support arm means secured to each end of said tubular support member, each said fork-like support arm means forming at the respective end of said tubular support member, as seen in side view, the leg portions of a triangle at the apex of which is arranged said tubular support member, each said support arm means surrounding said axle means with said apex of the respective triangle being disposed above said axle means, and means for elastically supporting said auxiliary frame from said main frame comprising securing means extending in one of the vehicle transverse and longitudinal directions, said securing means being provided on the free ends of each said support arm means and being disposed substantially along the base line of the respective triangle, and abutment means for said spring means arranged adjacent each said support arm means and rigidly secured to said auxiliary frame structure.

8. In a vehicle having a vehicle superstructure including a main frame and an auxiliary frame, at least one pair of oppositely disposed wheels, and means for spring supporting said wheels from said auxiliary frame including axle means and spring means, the improvement consisting essentially of an auxiliary frame structure for supporting said axle means comprising a tubular support member disposed above said axle means and extending in substantially the same direction as said axle means, separate fork-like support arm means secured to each end of said tubular support member, each said fork-like support arm means forming at the respective end of said tubular support member, as seen in side view, the leg portions of a triangle at the apex of which is arranged said tubular support member, each said support arm means surrounding said axle means with said apex of the respective triangle being disposed above said axle means, and means for elastically supporting said auxiliary frame from said main frame comprising securing means extending in one of the vehicle transverse and longitudinal directions, said securing means being provided on the free ends of each said support arm means and being disposed substantially along the base line of respective triangle, and abutment means for said spring means arranged adjacent each said support arm means and rigidly secured to said support member, said spring abutment means being of substantially box-shaped construction and being so secured to said support member that the side portions thereof adjoin said support arm means.

9. In a vehicle having a vehicle superstructure including a main frame and an auxiliary frame, at least one pair of oppositely disposed rear wheels, and means for spring supporting said wheels from said auxiliary frame including a single joint swinging half-axle rear axle means including axle gear means forming a part of one of the swinging half-axles, and spring means, the improvement essentially consisting of an auxiliary frame structure for supporting said rear axle means comprising a tubular support member disposed above said axle means and extending in substantially the same direction as said axle means, separate fork-like support arm means secured to each end of said tubular support member, each said fork-like support arm means extending downward and obliquely outwardly as seen in the vehicle longitudinal direction and forming at the respective end of said tubular support member, as seen in side view, the leg portions of a triangle at the apex of which is arranged said tubular support member, each said support arm means surrounding said axle means with said apex of the respective triangle being disposed above said axle means, and means for elastically supporting said auxiliary frame from said main frame comprising securing means extending in one of the vehicle transverse and longitudinal directions, said securing means being provided on the free ends of each said support arm means and being disposed substantially in the plane including the base line of the respective triangle and extending parallel to the road surface, abutment means for said spring means arranged adjacent each support arm means and rigidly secured to said tubular support member, said spring abutment means being of substantially box-shaped construction and being so secured to said tubular support member that the side portions thereof adjoin said support arm means, and means for elastically supporting said axle gear means at said auxiliary frame structure including first means elastically supporting said axle gear means at said support member for swinging movements about a substantially longitudinal vehicle axis and second means for elastically supporting said axle gear means at one of said support arm means to effectively brace said axle gear means in the vehicle transverse direction.

10. In a vehicle having a vehicle superstructure including a main frame and an auxiliary frame, at least one pair of oppositely disposed rear wheels, and means for spring supporting said wheels from said auxiliary frame including a single joint swinging half-axle rear axle means including axle gear means forming a part of one of the swinging half-axles, shock absorbers and spring means, the improvement consisting essentially of an auxiliary frame structure for supporting said rear axle means comprising a tubular support member disposed above said axle means and extending in substantially the same direction as said axle means, separate fork-like support arm means secured to each end of said tubular support member, each said fork-like support arm means extending downward and obliquely outwardly as seen in the vehicle longitudinal direction and forming at the respective end of said tubular support member, as seen in side view, the leg portions of a triangle at the apex of which is arranged said tubular support member, each said support arm means surrounding said axle means with said apex of the respective triangle being disposed above said axle means, and means for elastically supporting said auxiliary frame from said main frame comprising securing means etxending in one of the vehicle transverse and longitudinal directions, said securing means being provided on the free ends of each said support arm means and being disposed substantially in the plane including the base line of the respective triangle and extending parallel to the road surface, abutment means for said spring means arranged adjacent each support arm means and rigidly secured to said tubular support member, said spring abutment means being of substantially box-shaped construction and being so secured to said tubular support member that the side portions thereof adjoin said support arm means, said spring abutment means including securing means for said shock absorbers, and means for elastically supporting said axle gear means at said auxiliary frame structure including first means elastically supporting said axle gear means at said support member for swinging movements about a substantially longitudinal vehicle axis and second means for elastically supporting said axle gear means at one of said support arm means to effectively brace said axle gear means in the vehicle transverse direction.

References Cited in the file of this patent

UNITED STATES PATENTS

| | | |
|---|---|---|
| 903,447 | Bush | Nov. 10, 1908 |
| 2,746,556 | Nallinger et al. | May 22, 1956 |
| 2,801,865 | Katzung | Aug. 6, 1957 |
| 2,806,714 | Scherenberg et al. | Sept. 17, 1957 |
| 2,990,901 | Chayne | July 4, 1961 |